UNITED STATES PATENT OFFICE.

CHARLES J. STROSACKER, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING ACETIC ANHYDRIDE.

1,403,920.  Specification of Letters Patent.  Patented Jan. 17, 1922.

No Drawing.  Application filed March 12, 1918. Serial No. 222,008.

*To all whom it may concern:*

Be it known that I, CHARLES J. STROSACKER, a citizen of the United States, and a resident of Midland, county of Midland, and State of Michigan, have invented a new and useful Improvement in Methods of Making Acetic Anhydride, of which the following is a specification, the principle of the invention being herein explained and the best mode in which I have contemplated applying that principle, so as to distinguish it from other inventions.

While it has heretofore been proposed to make acetic anhydride, $(CH_3.CO)_2O$, by reacting on a suitable acetate with sulphur chloride (see German Patent No. 132,605), this method of manufacture has since been superseded by other methods, the more modern of which will be found described in Worden's "Technology of Cellulose Esters" (Vol. VIII, pp. 2526 et seq.). The principal of these more modern processes is that of Goldschmidt, who, in his German Patents (Nos. 222,236 and 241,898) points out the deficiencies in the older method above referred to.

I have found, however, that by proper manipulation, and particularly by proper control of the temperatures and pressures employed in the process, such older method, consisting, as stated, in reacting directly with sulphur chloride on a suitable acetate, may be made a commercial success. Obviously, in view of the greater convenience in handling sulphur chloride, instead of the reagents involved in the so-called more modern processes, this older process is the preferable one.

The present improvements accordingly consist of the steps hereinafter fully described and particularly pointed out in the claims, the following description setting forth only one specific method of carrying out my improved process, and it being understood that various changes may be made therein, all within the scope of the invention.

In carrying out my improved process, as already indicated, I use a suitable acetate, preferably sodium acetate, two parts, and placing the same in a suitable vessel which can be closed, I add gradually thereto one part of sulphur chloride, specifically the dichloride ($SCl_2$). During this stage in the operation the mixture is kept under pressure, approximately five pounds above atmospheric, and is cooled the while by applying water to the outside of the vessel, so as to maintain a temperature of the contents within at approximately 20° C. Under these conditions, the resultant acetic anhydride does not tend to volatilize to any serious extent, but remains relatively quiescent in the mixture.

The principal reaction that occurs is well understood, being represented by the formula:

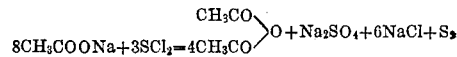

This reaction is practically instantaneous, and is complete as soon as the ingredients have been brought together in the proper proportions as indicated.

As soon as such reaction is complete a vacuum is applied and the mixture gradually heated so as to distill off the acetic anhydride, the temperature being gradually carried up to approximately 110° C., by which time all of the anhydride should have distilled over. There will be some acetic acid formed incidentally to the distillation stage which requires to be fractioned off from the product, but the amount of such acid is not serious, the formation thereof, as well as of other more baneful intermediate products, such as sulphur dioxide, being almost entirely prevented by carrying out the reaction and distillation under the conditions of temperature and pressure described.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The method of making acetic anhydride, which consists in mixing an acetate with sulphur chloride; maintaining the mixture at a temperature of approximately 20° C. and under a pressure of approximately five pounds above atmospheric; then applying a vacuum and gradually raising the temperature to approximately 110° C., whereby the anhydride is distilled off.

2. The method of making acetic anhydride, which consists in slowly adding one part of sulphur dichloride to two parts of dry sodium acetate; maintaining the mixture at a temperature of approximately 20° C. and under a pressure of approximately five pounds above atmospheric; then applying a vacuum and gradually raising the temperature to approximately 110° C., whereby the anhydride is distilled off.

Signed by me, this 6th day of March, 1918.

CHARLES J. STROSACKER.